US006651363B1

(12) United States Patent
Johnson

(10) Patent No.: US 6,651,363 B1
(45) Date of Patent: Nov. 25, 2003

(54) IMAGE DISPLAY AND VIEWER ASSEMBLY

(76) Inventor: Mark Johnson, 5510 S. Rice Ave., #2325, Houston, TX (US) 77081

( * ) Notice: Subject to any disclaimer, the term of this patent is extended or adjusted under 35 U.S.C. 154(b) by 0 days.

(21) Appl. No.: 10/145,772

(22) Filed: May 15, 2002

(51) Int. Cl.[7] .............................................. G02B 27/02
(52) U.S. Cl. ...................................... 40/361; 40/366
(58) Field of Search ........................ 40/361, 362, 366, 40/367, 757; 359/475, 477; D16/227, 221; 248/489

(56) References Cited

U.S. PATENT DOCUMENTS

| D30,180 S | * | 2/1899 | Knowles ................. D16/226 |
| 2,276,776 A | | 3/1942 | Hofmann |
| 2,441,607 A | * | 5/1948 | Walls ........................ 40/493 |
| 2,983,061 A | * | 5/1961 | Maiershofer ................. 40/365 |
| 3,785,073 A | * | 1/1974 | Van Tine ..................... 40/367 |
| 3,967,401 A | * | 7/1976 | Numbers ..................... 40/362 |
| 4,337,044 A | * | 6/1982 | Palmer ........................ 434/11 |
| 4,372,068 A | * | 2/1983 | Knapp et al. ................ 40/367 |
| 4,691,267 A | * | 9/1987 | Giesberg .................... 362/218 |
| 5,205,059 A | | 4/1993 | Doll |
| 5,855,279 A | * | 1/1999 | Klein et al. ................. 211/35 |
| 6,014,829 A | | 1/2000 | Wilson et al. |

FOREIGN PATENT DOCUMENTS

GB          901250    *  7/1962  ................. 40/367

* cited by examiner

Primary Examiner—Brian K. Green

(57) ABSTRACT

An image display and viewer assembly for providing a slide viewer incorporated into a displayed image. The image display and viewer assembly includes a main structure for holding and displaying an image. A slide viewer assembly is incorporated into the image to permit viewing of a backlit slide when one looks through the slide viewer assembly.

6 Claims, 3 Drawing Sheets

IMAGE DISPLAY AND VIEWER ASSEMBLY

BACKGROUND OF THE INVENTION

1. Field of the Invention

The present invention relates to image displays and more particularly pertains to a new image display and viewer assembly for providing a slide viewer incorporated into a displayed image.

2. Description of the Prior Art

The use of image displays is known in the prior art. U.S. Pat. No. 2,276,776 describes a device for supporting and displaying a transparency with backlighting. Another type of image display is U.S. Pat. No. 5,205,059 disclosing a device for holding a picture within a sealed enclosure. U.S. Pat. No. 6,014,829 discloses a light box for facilitating tracing an image.

While these devices fulfill their respective, particular objectives and requirements, the need remains for a device that is wall mountable, displays an image, and incorporates an illuminated slide viewer.

SUMMARY OF THE INVENTION

The present invention meets the needs presented above by providing a main structure for holding and displaying an image. A slide viewer assembly is incorporated into the image to permit viewing of a backlit slide when one looks through the slide viewer assembly.

Still yet another object of the present invention is to provide a new image display and viewer assembly that permits the display of multiple images including a main image display and at least one slide of another image viewable through a slide viewer assembly incorporated into the main image.

Even still another object of the present invention is to provide a new image display and viewer assembly that permits the simultaneous display of related images in a unique manner.

Yet even another object of the present invention is to provide a new image display and viewer assembly that permits a new form of presentation for a combination of multiple images in a single presented piece.

To this end, the present invention generally comprises a main structure for holding and displaying an image. A slide viewer assembly is incorporated into the image to permit viewing of a backlit slide when one looks through the slide viewer assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
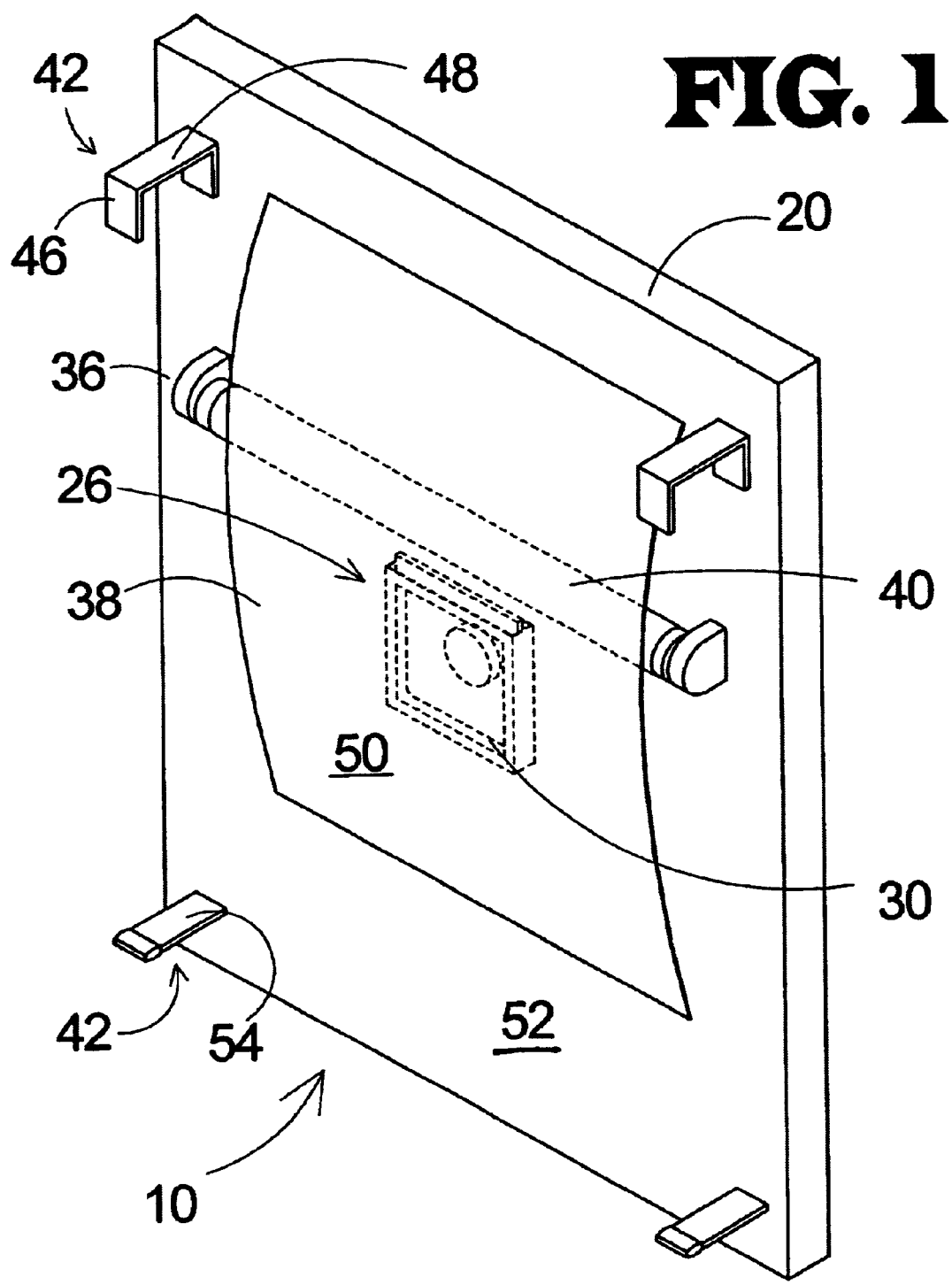
FIG. 1 is a perspective rear view of a new image display and viewer assembly according to the present invention.
Figure 2:
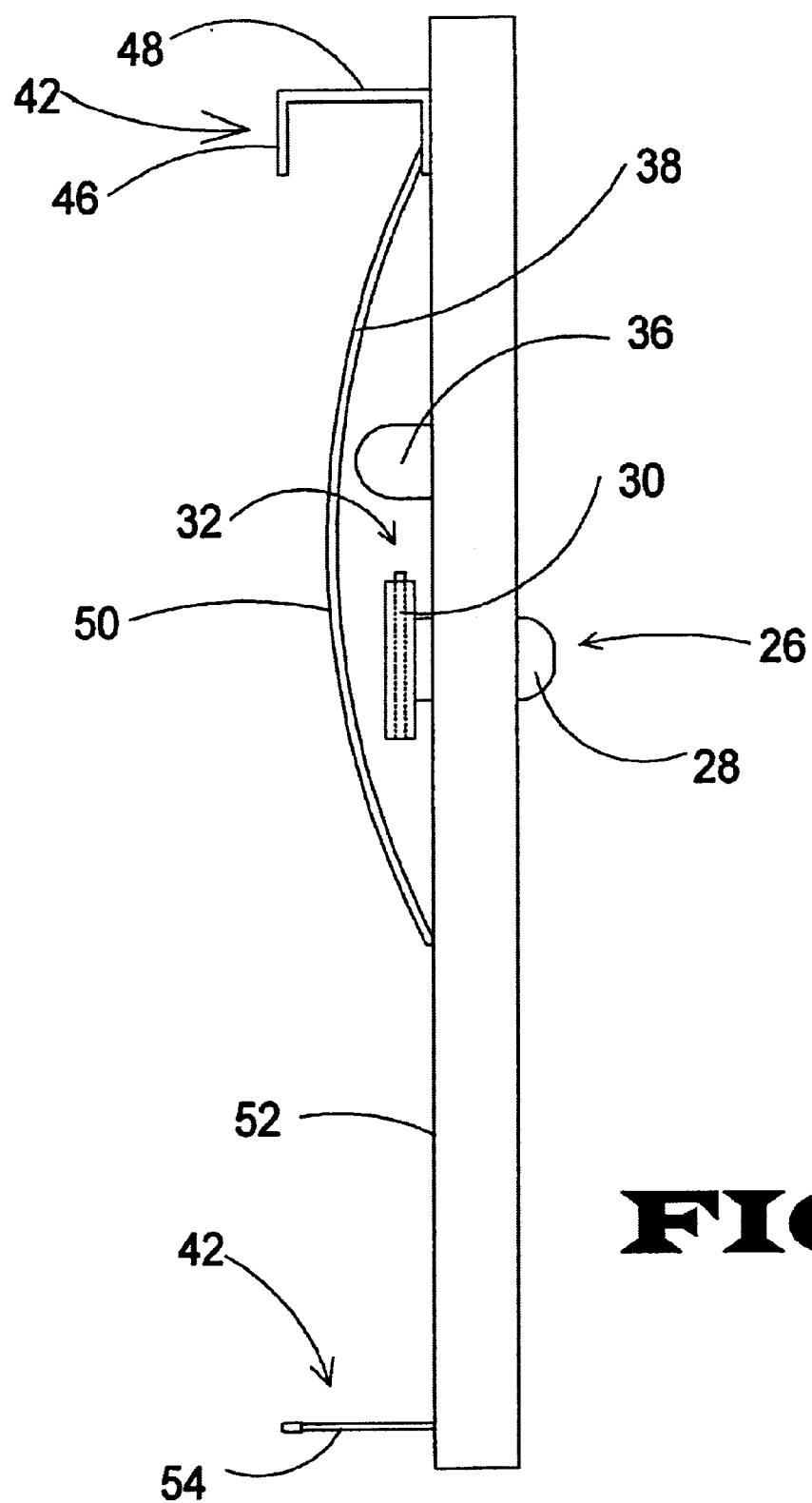
FIG. 2 is a side view of the present invention.
Figure 3:
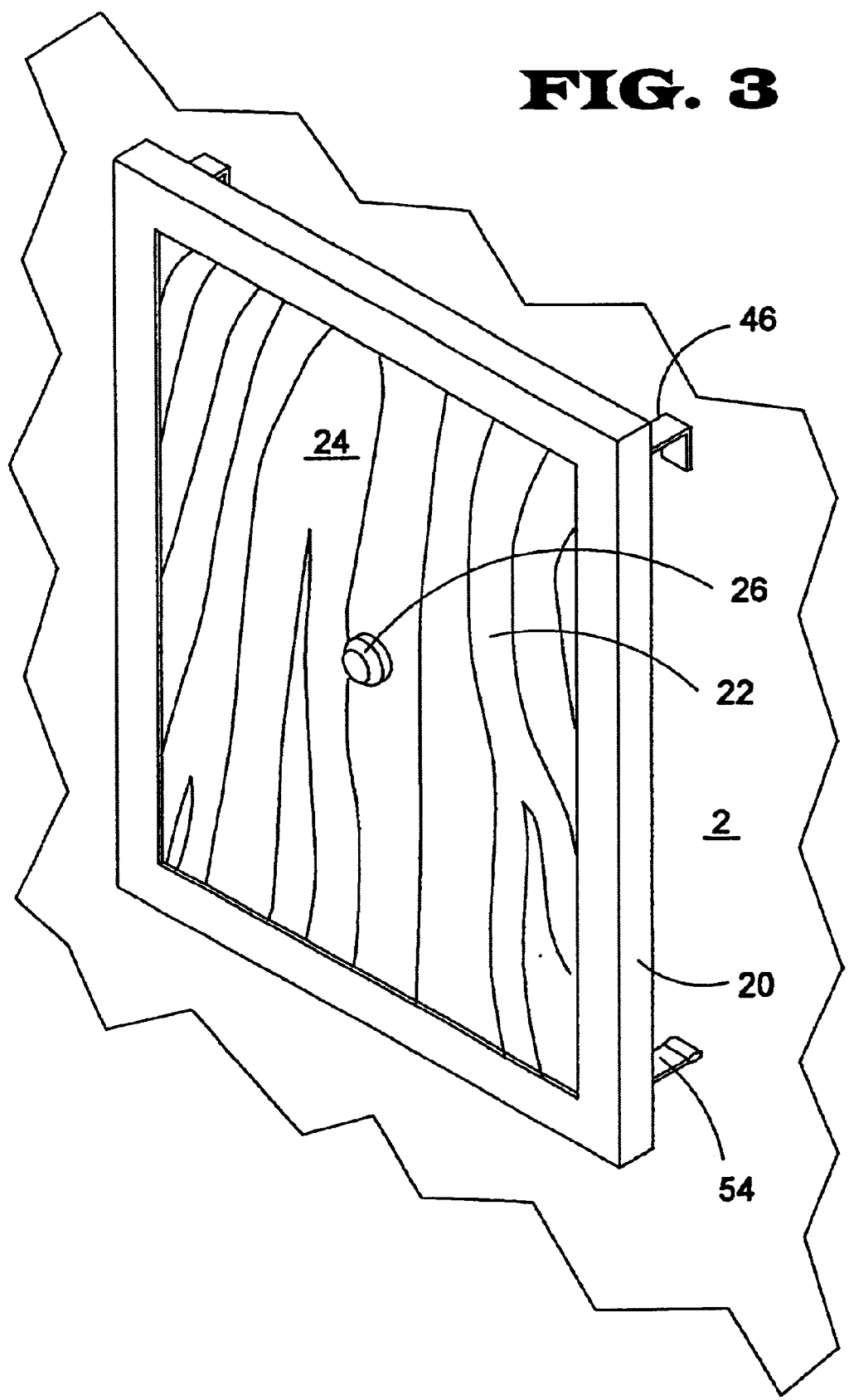
FIG. 3 is a perspective front view of the present invention.

With reference now to the drawings, and in particular to FIGS. 1 through 3 thereof, a new image display and viewer assembly embodying the principles and concepts of the present invention and generally designated by the reference numeral 10 will be described.

As best illustrated in FIGS. 1 through 3, the image display and viewer assembly 10 generally comprises a panel 20, and an image 22 on a first face 24 of the panel 20. A slide holding assembly 26 extends through an aperture in the panel 20. The aperture and slide holding assembly may contrast with the image 22 or be incorporated into the image to camouflage the presence of the slide holding assembly. The slide holding assembly 26 includes an eyepiece 28 positioned on said first face 24 for permitting looking through the slide holding assembly 26.

A slide 30 is held in a slot 32 in the slide holding assembly 26 adjacent the eyepiece 28. Thus, the eyepiece 28 is designed for permitting viewing of the slide 30 through the eyepiece 28.

A lighting assembly 36 is coupled to the panel 20 for providing backlight to the slide 30. The lighting assembly 36 includes a reflective member 38 positioned adjacent to a rear face 34 of the panel 20. The lighting assembly 36 further includes a light source 40 coupled to the panel 20 such that the light source 40 is positioned between the panel 20 and the reflective member 38 offset from the slide holding assembly. Thus, light from the light source 40 is reflected off of the reflective member 38 to provide indirect back lighting for the slide 30 when the slide is positioned in the slot 32.

In an embodiment, the reflective member 38 is arcuate for generally directing light from the light source 40 towards the slide 30.

A plurality of connectors 42 are coupled to the panel 20 such that the panel 20 is adapted for coupling to a vertical support surface 2. The plurality of connectors 42 include a pair of upper connectors 46. Each of the upper connectors 46 is generally U-shaped such that each of the upper connectors 46 has a medial flange portion 48 having a length greater than a distance between an outer surface 50 of the reflective member 38 and a rear surface 52 of the panel 20.

The plurality of connectors 42 further includes a pair of lower connectors 54. The upper and lower connectors 46 and 54 are positioned proximate the corners of the panel 20. The lower connectors 54 extend from the rear surface 52 of the panel a distance greater than the distance between the outer surface 50 of the reflective member 38 and the rear surface 52 of the panel 20. Thus, the plurality of connectors 42 are adapted for preventing the outer surface 50 of the reflective member 38 from contacting the vertical support surface 2.

In use, a slide is positioned in the slide holding assembly and the light source is activated (using either battery power or direct connection to an electrical source). A person may then view the image on the panel as well as look through the eyepiece to see the backlit slide. The images on the slide and the panel may be complimentary, contrasting, or unrelated.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An image display and viewer assembly comprising:

a generally planar panel;

an image on a first face of said panel whereby said panel has an appearance resembling a two-dimensional picture;

a slide holding assembly coupled to said panel, said slide holding assembly extending through said panel and having an eyepiece positioned on said first face of said panel for permitting looking through said panel into said slide holding assembly;

a slide coupled to said slide holding assembly adjacent said eyepiece whereby said eyepiece is adapted for permitting viewing of said slide through said eyepiece; and a lighting assembly coupled to said panel for providing backlight to said slides;

said lighting assembly including a reflective member positioned adjacent to a rear face of said panel; and said lighting assembly including a light source coupled to said panel such that said light source is positioned between said panel and said reflective member offset from said slide holding assembly whereby light from said light source is reflected off of said reflective member to provide indirect backlighting for said slide.

2. The image display and viewer assembly of claim 1 wherein said reflective member is arcuate for generally directing light from said light source towards said slide.

3. The image display and viewer assembly of claim 1 further comprising:

a plurality of connectors coupled to said panel whereby said panel is adapted for coupling to a vertical support surface such that said panel is positioned in spaced substantially parallel relationship to the vertical support surface.

4. The image display and viewer assembly of claim 3 wherein said plurality of connectors includes a pair of upper connectors, each of said upper connectors being generally U-shaped.

5. The image display and viewer assembly of claim 4 wherein each of said upper connectors has a medial flange portion, each said medial flange portion having a length greater than a distance between an outer surface of said reflective member and a rear surface of said panel; and said plurality of connectors including at least one lower connector, said lower connector extending from said rear surface of said panel a distance greater than the distance between said outer surface of said reflective member and said rear surface of said panel whereby said plurality of connectors are adapted for preventing said outer surface of said reflective member from contacting the vertical support surface.

6. An image display and viewer assembly comprising:

a generally planar panel;

an image on a first face of said panel whereby said panel has an appearance resembling a two-dimensional picture;

a slide holding assembly coupled to said panel, said slide holding assembly extending through said panel and having an eyepiece positioned on said first face of said panel for permitting looking through said panel into said slide holding assembly;

a slide coupled to said slide holding assembly adjacent said eyepiece whereby said eyepiece is adapted for permitting viewing of said slide through said eyepiece;

a lighting assembly coupled to said panel for providing backlight to said slide;

wherein said lighting assembly includes a reflective member positioned adjacent to a rear face of said panel;

wherein said lighting assembly further includes a light source coupled to said panel such that said light source is positioned between said panel and said reflective member offset from said slide holding assembly whereby light from said light source is reflected off of said reflective member to provide indirect backlight backlighting for said slide;

wherein said reflective member is arcuate for generally directing light from said light source towards said slide;

a plurality of connectors coupled to said panel whereby said panel is adapted for coupling to a vertical support surface;

wherein said plurality of connectors includes a pair of upper connectors, each of said upper connectors being generally U-shaped;

wherein each of said upper connectors has a medial flange portion, each said medial flange portion having a length greater than a distance between an outer surface of said reflective member and a rear surface of said panel; and said plurality of connectors including at least one lower connector, said lower connector extending from said rear surface of said panel a distance greater than the distance between said outer surface of said reflective member and said rear surface of said panel whereby said plurality of connectors are adapted for preventing said outer surface of said reflective member from contacting the vertical support surface.

* * * * *